United States Patent [19]

Gerhardinger et al.

[11] Patent Number: 5,538,547
[45] Date of Patent: Jul. 23, 1996

[54] PROCESS FOR IMPREGNATING WOOD

[75] Inventors: Dieter Gerhardinger; Hans Mayer, both of Burghausen; Guenther Kolleritsch, Neuoetting, all of Germany

[73] Assignee: Wacker-Chemie GmbH, Munich, Germany

[21] Appl. No.: 229,496

[22] Filed: Apr. 19, 1994

[30] Foreign Application Priority Data

Apr. 22, 1993 [DE] Germany .................. 43 13 219.7

[51] Int. Cl.$^6$ .................. C09K 3/18; C09D 3/14; C09D 183/08; B27K 3/52
[52] U.S. Cl. .................. 106/2; 106/287.28; 106/287.11; 106/287.13; 106/15.05; 106/18.12; 106/18.32; 427/297; 427/440; 524/379; 524/385; 524/391; 524/765; 524/801; 524/871; 528/38; 528/26; 528/25; 528/12; 528/33; 106/15.05; 106/18.12; 106/18.32
[58] Field of Search .................. 106/2, 15.05, 18.12, 106/18.32, 287.11, 287.13, 287.28; 427/297, 440; 524/379, 385, 391, 765, 801, 871; 528/38, 26, 25, 12, 33

[56] References Cited

U.S. PATENT DOCUMENTS

| | | | |
|---|---|---|---|
| 4,661,551 | 4/1987 | Mayer et al. | 524/379 |
| 4,757,106 | 7/1988 | Mayer | 106/287.11 |
| 5,039,724 | 8/1991 | Demlehner et al. | 524/267 |
| 5,073,195 | 12/1991 | Cuthbert et al. | 106/2 |
| 5,120,581 | 6/1992 | Brunken et al. | 427/387 |
| 5,228,905 | 7/1993 | Grunewalder et al. | 106/2 |
| 5,250,106 | 10/1993 | Roth et al. | 106/2 |

FOREIGN PATENT DOCUMENTS

| | | |
|---|---|---|
| 3900303 | 7/1990 | Germany . |
| 4241727 | 6/1994 | Germany . |

Primary Examiner—Melissa Bonner
Attorney, Agent, or Firm—Martin Connaughton

[57] ABSTRACT

A process for impregnating wood and wood products wherein the wood is treated with a composition comprising;

(A) a salt of an organic or inorganic acid and an organopolysiloxane which contains SiC-bonded radicals with basic nitrogen in amounts of at least 0.5% by weight of basic nitrogen, based on the weight of this organopolysiloxane, (B) a water-repellent active compound which is not solid at 20° C. under 1020 hPa, with the proviso that the water-repellent active compound can also be an organosilicon compound which is solid at 20° C. under 1020 hPa and dissolves under these conditions to the extent of more than 50 parts by weight in 100 parts by weight of (A), if appropriate mixed with an organosilicon compound containing basic nitrogen in amounts of 0% to 0.5% by weight, based on the weight of this organosilicon compound, and/or silicic acid esters, and (c) water.

Wood and wood products treated with the composition described above exhibit substantially reduced water absorption.

4 Claims, No Drawings

PROCESS FOR IMPREGNATING WOOD

FIELD OF INVENTION

The present invention relates to a process for impregnating wood with an aqueous composition comprising an organosilicon containing basic nitrogen, a water-repellent active compound and water.

BACKGROUND OF INVENTION

Organosilicon compounds are employed in building protection because of their outstanding impregnating action, their water and dirt repellency, their environmental-friendliness and their physiological acceptability. For a composition to perform effectively as a wood preservative it is essential that there be rapid and deep penetration. DE-A-3 900 303 describes the impregnation of wood with an aqueous solution of propyltrimethoxysilane. U.S. Pat. No. 5,073, 195 describes the treatment of wood with an aqueous solution of a water-soluble silane coupling agent and an alkyltri-alkoxysilane. However, these aqueous solutions do not have a long storage life since there is rapid formation of water-insoluble condensation products which hardly penetrate into the wood subsequently.

German patent application P 42 41 727 of Dec. 10, 1992, describes organopolysiloxane-containing compositions which are self-dispersing in water and comprise (A) a salt of an organic or inorganic acid and an organopolysiloxane which contains SiC-bonded radicals with basic nitrogen in amounts of at least 0.5% by weight of basic nitrogen, based on the weight of this organopolysiloxane, (B) a solid which is soluble in water at 20° C. under 1020 hPa to the extent of at most one part by weight in 100 parts by weight, excluding organosilicon compounds which are solid at 20° C. under 1020 hPa and dissolve under these conditions to the extent of more than 50 parts by weight in 100 parts by weight (A), optionally mixed with (C) an organosilicon compound containing basic nitrogen in amounts of 0% to 0.5% by weight, based on the weight of this organosilicon compound, and the treatment of wood with these compositions.

SUMMARY OF INVENTION

The object of the present invention is to provide a process for impregnating wood and products produced from wood, such as chip-board, in which the impregnated wood is particularly resistant to moisture.

The present invention relates to a process for impregnating wood in which the wood is treated with a composition which comprises (A) a salt of an organic or inorganic acid and an organopolysiloxane which contains SiC-bonded radicals with basic nitrogen in amounts of at least 0.5% by weight of basic nitrogen, based on the weight of this organopolysiloxane, (B) a water-repellent active compound which is not solid at 20° C. under 1020 hPa, with the proviso that the water-repellent active compound can also be an organosilicon compound which is solid at 20° C. under 1020 hPa and dissolves under these conditions to the extent of more than 50 parts by weight in 100 parts by weight of (A), optionally mixed with an organosilicon compound containing basic nitrogen in amounts of 0% to 0.5% by weight, based on the weight of this organosilicon compound, and/or silicic acid esters, and (c) water.

The term "basic nitrogen" as used in the context of this invention with quantities relates to nitrogen calculated as element.

Compounds which can be employed as component (A) in the impregnating composition are already known. Reference may be made in this context to U.S. Pat. No. 4,661,551. Component (A) acts as a surfactant and at the same time is water-repellent.

The organopolysiloxanes from which constituent (A) of the impregnating composition is obtainable by reaction with an organic or inorganic acid are preferably units of the general formula

wherein

R can be identical or different and represents hydrogen or monovalent SiC-bonded organic radicals which are free from basic nitrogen, $R^1$ can be identical or different and represents monovalent, SiC-bonded radicals containing basic nitrogen, $R^2$ can be identical or different and represents a hydrogen atom or monovalent organic radicals, a is 0, 1, 2 or 3, b is 0, 1, 2 or 3 and c is 0, 1, 2 or 3, with the proviso that b is on average at least 0.05, the sum of a, b and c is less than or equal to 3 and the radical $R^1$ is present in amounts of more than 0.5% by weight of basic nitrogen per organopolysiloxane molecule.

The radical R is preferably optionally substituted hydrocarbon radicals having 1 to 20 carbon atoms, hydrocarbon radicals having 1 to 8 carbon atoms, in particular the methyl and the isooctyl radical, being particularly preferred.

Preferably, a hydrocarbon radical, in particular a methyl radical, is also bonded to each silicon atom to which a hydrogen atom is bonded.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl, allyl, n-5-hexenyl, 4-vinylcyclohexyl and the 3-norbornenyl radical; cycloalkyl radicals, such as cyclopentyl, cyclohexyl, 4-ethylcyclohexyl and cycloheptyl radicals, norbornyl radicals and methylcyclohexyl radicals; aryl radicals, such as the phenyl, biphenylyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted hydrocarbon radicals as radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and the chlorophenyl, dichlorophenyl and trifluorotolyl radical; mercaptoalkyl radicals, such as the 2-mercaptoethyl and 3-mercaptopropyl radical; cyanoalkyl radicals, such as the 2-cyanoethyl and 3-cyanopropyl radical; acyloxyalkyl radicals, such as the 3-acryloxypropyl and 3-methacryloxypropyl radical; hydroxyalkyl radicals, such as the hydroxypropyl radical, and radicals of the formula

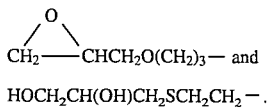

$HOCH_2CH(OH)CH_2SCH_2CH_2-$.

The radical $R^1$ is preferably a radical of the general formula $$R^3_2NR^4- \qquad (II),$$

in which $R^3$ can be identical or different and represents hydrogen or a monovalent, optionally substituted hydrocarbon radical and $R^4$ represents a divalent hydrocarbon radical.

Examples of radical $R^3$ are the examples of hydrocarbon radicals given for radical R and hydrocarbon radicals substituted by amino groups, such as aminoalkyl radicals, the aminoethyl radical being particularly preferred.

Preferably, at least one hydrogen atom is bonded to each nitrogen atom in the radicals of formula (II).

The radical $R^4$ is preferably divalent hydrocarbon radicals having 1 to 10 carbon atoms, particularly preferably 1 to 4 carbon atoms, in particular the n-propylene radical.

Examples of the radical $R^4$ are the methylene, ethylene, propylene, butylene, cyclohexylene, octadecylene, phenylene and butenylene radical.

Examples of radical $R^1$ are

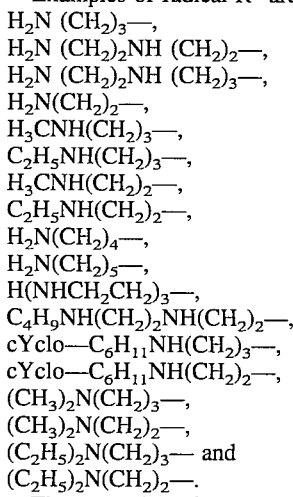

The examples of alkyl radicals R also apply in the full scope to the radical $R^2$.

The preferred average value for a is 0 to 2, in particular 0 to 1.8.

The preferred average value for b is 0.1 to 0.6, in particular 0.15 to 0.30.

The preferred average value for c is 0 to 0.8, in particular 0.01 to 0.6.

Examples of organopolysiloxanes of units of formula (I) are the reaction product of an e,w-dihydroxydimethylpolysiloxane and N-(2-aminoethyl)-3-aminopropyltrimethoxysilane having a viscosity of 20 to 50 mm²/s (25° C.) and an amine number of 2.7 to 3.2 (siloxane i) and the reaction product of $CH_3Si(OC_2H_5)_{0.8}O_{1.1}$ and N-(2-aminoethyl)-3-aminopropyltrimethoxysilane having a viscosity of 60 mm²/s (25° C.) and an amine number of 2.15 (siloxane ii), siloxane i being particularly preferred and the amine number corresponding to the number of ml of 1 N HCl needed to neutralize 1 g of substance.

The organopolysiloxanes of units of formula (I) preferably have a viscosity of 5 to 2500, in particular 10 to 500 mm²/s, at 25° C.

Organopolysiloxanes of formula (I) can be prepared in a known manner, for example by equilibration or condensation of amino-functional silanes with organopolysiloxanes which are free from basic nitrogen.

The organic or inorganic acids which are used for preparation of constituent (A) of the composition according to the invention can be the same as those which were previously possible to employ for preparation of salts of an organic or inorganic acid and an organopolysiloxane with SiC-bonded radicals containing basic nitrogen. Examples of such acids are HCl, $H_2SO_4$, acetic acid, trifluoroacetic acid, propionic acid and diethyl hydrogen phosphate. Acid halides which react in contact with an organopolysiloxane containing basic nitrogen, if appropriate together with water, either via the corresponding acids or directly to give component (A) can also be employed. Examples of suitable acid halides are alkyl- or arylsulfonyl halides, the optionally halogen-substituted alkyl or aryl radicals of which correspond to the above radical R, such as pentafluorooctylsulfonyl chloride. Propionic acid and acetic acid are preferred and acetic acid is particularly preferred.

The organopolysiloxane salt employed as component (A) can be a single type of this salt or a mixture of at least two types of such a salt.

The water-repellent active compound (B) comprises compounds which are known per se and which have also been employed to date for rendering, for example, building materials, textiles, leather or paper water-repellent. Mixtures of various compounds which render materials water-repellent or only one compound can be employed as water-repellent active compound (B). Organosilicon compounds containing basic nitrogen in amounts of 0% to 0.5% by weight, based on the weight of this organosilicon compound, silicic acid esters or organofluorine compounds are preferably employed as the compounds which render the materials waterrepellent.

The organosilicon compounds or silicic acid esters employed for the compounds which render the materials water-repellent are preferably those of units of the formula $$R_d^5(OR^6)_eSiO_{\frac{4-d-e}{2}} \qquad (III)$$

in which $R^5$ can be identical or different and represents hydrogen or monovalent, SiC-bonded organic radicals, $R^6$ can be identical or different and represents a hydrogen atom or monovalent organic radicals, d is 0, 1, 2, 3 or 4 and is 0, 1, 2, 3 or 4, with the proviso that the sum of d and e is less than or equal to 4 and the content of basic nitrogen is 0% to 0.5% by weight, based on the weight of the particular organosilicon compound.

Examples of the radical $R^5$ are the examples given for the radical R and hydrocarbon radicals substituted by amino group.

Examples of the radical $R^6$ are the examples given for $R^2$.

The organosilicon compound of formula (III) can be a silane, where the sum of d and e is equal to 4.

The organosilicon compounds of formula (III) can also be an organosiloxane, where the sum of d and e is less than or equal to 3.

The compounds of formula (III) are silicic acid esters if d is equal to 0.

Preferred examples of silanes of general formula (III) are the organoalkoxysilanes having 1 or 2 identical or different, optionally halogen-substituted monovalent $C_1$–$C_{15}$-hydrocarbon radicals bonded via SiC, in which the other radicals are identical or different $C_1$–$C_6$-alkoxy radicals. i-Octyltrimethoxysilane and i-octyltriethoxysilane are particularly preferred.

Preferred examples of silicic acid esters of formula (III) are monomeric and/or polymeric silicic acid esters having $C_1$–$C_6$alkoxy radicals and a viscosity of not more than 20 mm²/s at 25° C. A particular silicic acid ester or a mixture of various silicic acid esters can be used. Preferred silicic acid esters contain $C_1$–$C_3$-alkoxy radicals and have a viscosity of 1 to 5 mm²/s at 25° C. Examples of preferred silicic acid esters are tetramethyl silicate, tetraethyl silicate and tetraisopropyl silicate.

Preferred examples of organosiloxanes of formula (III) are alkylalkoxysiloxanes, such as those which are obtainable by reaction of methyltrichlorosilane and a $C_1$–$C_8$-alkyltrichlorosilane or phenyltrichlorosilane with methanol or ethanol in water, such as the organopolysiloxanes of the empirical formulas $CH_3Si(OC_2H_5)_{0.8}O_{1.1}$,
$C_6H_5Si(OC_2H_5)_{0.72}O_{1.14}$ or
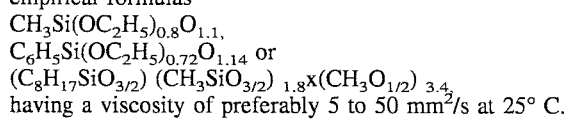
having a viscosity of preferably 5 to 50 mm²/s at 25° C.

Further preferred examples of organosiloxanes of formula (III) are linear organopolysiloxanes which contain exclusively methyl, phenyl or 3,3,3-trifluoropropyl radicals as radicals $R^5$ in the chain and contain hydroxyl groups as terminal groups, such as the polydimethylsiloxanes having in each case a hydroxyl group at both ends and a viscosity of preferably 100 to 180 mm²/s at 25° C.; linear organopolysiloxanes which contain exclusively methyl, phenyl or 3,3,3-trifluoropropyl radicals as radicals $R^5$ such as the polydimethylsiloxanes having a viscosity of preferably 0.5 to 05 mm²/s at 25° C., and linear organopolysiloxanes which contain exclusively methyl, phenyl or hydrogen radicals as radicals $R^5$, such as the polydimethylsiloxanes having a hydrogen content of 0.05% to 5.0% by weight and a chain length of preferably 20 to 70 dimethylsiloxane units, and a viscosity of preferably 10 to 1000 mm²/s at 25° C.

Further preferred examples of organosiloxanes of formula (III) are branched organosiloxanes which contain exclusively alkyl radicals having 1 to 12 carbon atoms as radicals $R^5$ such as the polydimethylsiloxanes which comprise 2 to 20 siloxane units of the formulas $R^7(CH_3)SiO_{3/2}$, $R^7(CH_3)SiO_{1/2}$ and $R^7SiO_{3/2}$, in which $R^7$ represents an alkyl radical having 4 to 12 carbon atoms.

Further preferred examples of organosiloxanes of formula (III) are organosiloxane resins. The index d preferably has a value of 0.8 to 1.8, in particular 1.0 to 1.7. The index preferably has a value of 0 to 0.5 and the sum of d+e has a maximum value of 1.9. Preferred organosiloxane resins are built up from units of the formulas $R^8{}_3SiO_{1/2}$, $R^8{}_2SiO_{2/2}$ and $SiO_{4/2}$, or from units of the formulas $R^8{}_2SiO_{2/2}$ and $R^8SiO_{3/2}$, in which $R^8$ represents the radicals $R^5$ or $OR^6$ designated in the above formula III. A preferred example of an organosiloxane resin is the resin of the empirical formula $MeSiO_{1.48}(OEt)_{0.04}$ (commercially obtainable under the name "BS 1321" from Wacker-Chemie GmbH, Munich) with a melting point of about 60° C.

If the organosilicon compound employed as component (B) is solid at 20° C. under 1020 hPa, this must dissolve under these conditions to the extent of more than 50 parts by weight in 100 parts by weight of (A) or 100 parts by weight of a mixture of (A) and organosilicon compound containing basic nitrogen in amounts of 0% to 0.5% by weight, based on the weight of this organosilicon compound, and/or silicic acid esters. The above mentioned silanes, siloxanes having a viscosity of not more than 2 mm²/s at 25° C. and monomeric silicic acid esters of formula (III) are employed in particular to increase the solubility of the solid organosilicon compounds.

Preferred organofluorine compounds which can be employed as water-repellent active compound (B) are, for example, fluorinated, in particular perfluorinated, hydrocarbons, fluorinated acrylic and methacrylic acid esters, fluoroalkanesulfonic acids and the salts of fluorinated carboxylic acids, in particular if these contain a perfluoroalkyl radical having at least 4 carbon atoms. Examples of preferred monovalent fluorinated carboxylic acid salts are the alkali metal salts of arylcarboxylic acids, such as benzoic acids or naphthoic acids with one or two perfluoroalkyl radicals having preferably 4 to 18 carbon atoms. The organofluorine compounds preferably have a fluorine content of at least 10% by weight.

Component (B) can contain solubilizing agents which are neither organosilicon compounds nor silicic acid esters. Preferred solubilizing agents are alkylene glycols, such as propylene glycol, mono- and dicarboxylic acid esters which are known as plasticizers and have a total of 10 to 30 carbon atoms in the molecule, such as dioctyl adipate and dioctyl phthalate, and ketones having at least 5 carbon atoms, such as methylpentanone. Component (B) preferably contains the solubilizing agents to the extent of 0% to 40% in particular 0% to 10% by weight Component (B) can contain additives for certain purposes, in addition to the above mentioned constituents. Suitable additives are, for example, tanning agents, fungicides, bactericides, preservatives, algicides, microbicides, odoriferous substances, flavor substances, flameproofing agents and solids which absorb ultraviolet light. Component (B) contains additives in each case preferably in amounts of 0.001% to 1% by weight, in particular 0.01% to 0.1% by weight.

In the process according to the invention, 40 to 800, in particular 80 to 500, parts by weight of component (B) are preferably employed per 100 parts by weight of component (A), component (B) also including the organosilicon compounds containing basic nitrogen in amounts of 0% to 0.5% by weight, based on the weight of this organosilicon compound, and/or silicic acid esters added to increase the solubility of the solid organosilicon compounds, and any solubilizing agents and additives which may be present. Parts by weight of water (C) are preferably also added to the sum of the parts by weight of components (A) and (B) in an amount such that an approximately 3% to 20%, in particular 6% to 15% strength by weight ready-to-use aqueous impregnating solution exists.

The impregnating composition has a pH of preferably 4 to 7, more preferably 5.

The impregnating composition is prepared by mixing an organopolysiloxane of formula (I) with an organic or inorganic acid to form component (A) and with the constituents of component (B) and then mixing the mixture with water (C). All the above mixing steps are preferably carried out at a temperature of 15° C. to 120° C., in particular at 20° C. to 30° C., under a pressure of 0.09 to 0.11 mPa.

The mixture of components (A) and (B) gives stable aqueous dilutions with water spontaneously without consuming large amounts of mechanical energy, merely by bringing the mixture together with water and stirring. The hydrophobic active compound (B) employed according to the invention is thereby distributed, uniformly and very finely dispersed, in the water.

The impregnating composition can be applied to the wood in a manner which is known, such as in the boiler pressure process by full impregnation, empty-cell impregnation, alternating pressure impregnation, vacuum impregnation or combinations thereof, by sap displacement by pressure absorption impregnation, open-tank absorption or open-tank pressure absorption impregnation, by diffusion impregnation or by open-tank impregnation, such as by formulated impregnating baths, as well as by brushing, dipping, flooding and spraying.

The process according to the invention has the advantage that the treated wood has water-repellent properties. Furthermore, it is possible, using the process according to the invention, for the hydrophobic active compound as component (B) in the composition to be introduced uniformly and very finely into the wood to be treated. The term "wood" is not limited to timber, but also includes products produced from wood, such as chip-board, fiber-board, wood chips, wood wool and wood flour.

In the following examples, all the parts and percentages relate to the weight, unless stated otherwise. Unless stated otherwise, the following examples are carried out under a pressure of the surrounding atmosphere at about 0.10 mPa, and at room temperature at about 20° C., or at a temperature which is established when the reactants are brought together at room temperature without additional heating or cooling. All the viscosity data given in the examples are based on a temperature of 25° C.

EXAMPLES

Preparation of organopolysiloxanes containing basic nitrogen

Siloxane A 150 g of N-(2-aminoethyl)-3-aminopropyltrimethoxysilane were added with stirring to a mixture of 0.2 g of KOH in 4 g of methanol and 500 g of an α,w-dihydroxy-methylpolysiloxane which contains in each case an Si-bonded hydroxyl group in the terminal units and has an average molecular weight of about 4000 g/mol in a 1 liter three-necked flask provided with a stirrer, dropping funnel and reflux condenser, and the mixture thus obtained was heated at the boiling point under reflux for 6 hours; it was then cooled to 30° C. and mixed with 2.5 ml of 10% strength hydrochloric acid. Finally, the methanol was distilled off by heating up to 140° C., and the organopolysiloxane thus obtained was freed from KCl by filtration. The organopolysiloxane thus obtained had a viscosity of 50 mm$^2$/s at 25° C. and contained 2.9% of basic nitrogen.

Siloxane B

The preparation was carried out analogously to the preparation of siloxane A, but with 250 g of N-(2-amino-ethyl)-3-aminopropyltrimethoxysilane. The organopolysiloxane thus obtained had a viscosity of 20 mm$^2$/s at 25° C. and contained 3.2% of basic nitrogen.

EXAMPLES 1–11

The constituents shown below were mixed at room temperature in the stated sequence. Clear solutions were obtained in all the examples. In each case, 9 parts of water were then added to one part of the clear solution and the mixtures were stirred. Transparent, stable impregnating compositions were obtained.

Example 1

15.4 g of siloxane B 80.8 g of isooctyltriethoxysilane 3.8 g of propionic acid (98% strength by weight in water)

Example 2

25.0 g of siloxane A 57.7 g of n-octyltriethoxysilane 3.1 g of propionic acid (98% strength by weight in water)

Example 3

40.0 g of siloxane B 47.0 g of linear polydimethylsilicone oil having methylene end groups and a viscosity of 0.65 mm$^2$/s 3.0 g of acetic acid (98% strength by weight in water)

Example 4

48.6 g of siloxane B 48.6 g of linear polydimethylsilicone oil having hydroxyl end groups and a viscosity of 100 to 180 mm$^2$/s 2.4 g of acetic acid (98% strength by weight in water)

Example 5

38.8 g of siloxane B 38.8 g of linear polydimethylsilicone oil having hydroxyl end groups and a viscosity of 100 to 180 mm$^2$/s 20.0 g of propylene 1,2-glycol 2.4 g of acetic acid (98% strength by weight in water)

Example 6

27.8 g of siloxane A 35.0 g of isooctyltrimethoxysilane 10.0 g of silicic acid ester of the empirical formula Si(OC$_2$H$_5$)$_4$ having a viscosity of 1.0 mm$^2$/s (obtainable under the trade name "Silikat TES 28" from Wacker-Chemie GmbH, Munich)

20.8 g of organopolysiloxane of the empirical formula CH$_3$Si(OC$_2$H$_5$)$_{0.8}$O$_{1.1}$ having an average molecular weight of about 600 g/mole and a viscosity of about 20 mm$^2$/s 6.4 g of acetic acid (98% strength by weight in water)

Example 7

24.0 g of siloxane A 46.0 g of isooctyltrimethoxysilane 10.0 g of silicic acid ester of the empirical formula Si(OC$_2$H$_5$)$_4$ having a viscosity of 1.0 mm$^2$/s (obtainable under the trade name "Silikat TES 28" from Wacker-Chemie GmbH, Munich)

10.0 g of organopolysiloxane of the empirical formula (C$_8$H$_{17}$SiO$_{3/2}$) (CH$_{3SiO3/2}$)$_{1.8}$x(CH$_3$O$_{1/2}$)$_{3.4}$ having an average viscosity of about 10 to 30 mm$^2$/s 6.0 g of acetic acid (98% strength by weight in water)

Example 8

9.5 g of siloxane A 4.5 g of isooctyltrimethoxysilane 7.0 g of silicic acid ester of the empirical formula Si(OC$_2$H$_5$)$_4$ having a viscosity of 1.0 mm$^2$/s (obtainable under the trade name "Silikat TES 28" from Wacker-Chemie GmbH, Munich)

4.5 g of organopolysiloxane of the empirical formula CH$_3$Si(OC$_2$H$_5$)$_{0/8}$O$_{1.1}$ having an average molecular weight of about 600 g/mole and a viscosity of about 20 mm$^2$/s 4.5 g of acetic acid (98% strength by weight in water)

30.0 g of resin comprising 80% of MeSiO$_{3/2}$ and 20% of MeSiO$_{2/2}$ units and having an average viscosity of 106 mm$^2$/s Example 9

5.6 g of siloxane B 2.4 g of isooctyltrimethoxysilane 9.7 g of silicic acid ester of the empirical formula $Si(OC_2H_5)_{2.3}O_{0.83}$ having a viscosity of 4 mm²/s (obtainable under the trade name "Silikat TES 40" from Wacker-Chemie GmbH, Munich)

19.2 g of organopolysiloxane of the empirical formula $(C_8H_{17}SIO_{3/2})(CH_3SIO_{3/2})_{1.8}x(CH_3O_{1/2})_{3.4}$ having an average viscosity of about 10 to 30 mm²/s 6.0 g of acetic acid (98% strength by weight in water)

16.7 g of organopolysiloxane, solid at room temperature, of the empirical formula $MeSiO_{1.48}(OEt)_{0.04}$ (commercially obtainable under the name "BS 1321" from Wacker-Chemie GmbH, Munich)

Example 10

18.0 g of siloxane A 34.5 g of isooctyltrimethoxysilane 10.5 g of silicic acid ester of the empirical formula $Si(OC_2H_5)_4$ having a viscosity of 1.0 mm²/s (obtainable under the trade name "Silikat TES 28" from Wacker-Chemie GmbH, Munich)

7.5 g of organopolysiloxane of the empirical formula $(C_8H_{17}SIO_{3/2})(CH_3SIO_{3/2})_{1.8}x(CH_3O_{1/2})_{3.4}$ having an average viscosity of about 10 to 30 mm²/s 4.5 g of acetic acid (98% strength by weight in water)

25.0 g of resin comprising 80% of $MeSiO_{3/2}$ and 20% of $Me_2SiO_{2/2}$ units and having an average viscosity of 106 mm²/s Example 11

12.0 g of siloxane A 23.0 g of isooctyltrimethoxysilane 7.0 g of silicic acid ester of the empirical formula $Si(OC_2H_5)_4$ having a viscosity of 1.0 mm²/s (obtainable under the trade name "Silikat TES 28" from Wacker-Chemie GmbH, Munich)

5.0 g of organopolysiloxane of the empirical formula $(C_8H_{17}SiO_{3/2})(CH_3SIO_{3/2})_{1.8}x(CH_3O_{1/2})_{3.4}$ having an average viscosity of about 10 to 30 mm²/s 3.0 g of acetic acid (98% strength by weight in water)

50.0 g of linear polydimethylsilicone oil having a content of 1.6% of hydrogen atoms and a viscosity of 20 to 25 mm²/s Pine end-grained wood having a residual moisture content of 9.2% by weight (size 7 cm×7 cm×1 cm) was placed in a glass container of 1 liter capacity filled with the impregnating composition, and was clamped in a capstan. The impregnation was carried out by rotational movement at 12 revolutions per minute over 8 hours at room temperature. The test specimen was then dried at 23° C. for 3 weeks at 50% relative atmospheric humidity.

The impregnated test specimens were stored floating on water at 23° C., freed from adhering water with filter paper and, after 30 and 60 minutes, weighed. The water absorption was determined in percentage by weight. The impregnating action results from the water absorption values (60-minute value WA) of the untreated to the impregnated wood.

$$100 - \frac{\% \text{ WA impregnated} \times 100}{\% \text{ WA untreated.}} = \text{impregnating action}$$

The results are summarized in Table I.

TABLE I

| | Wood impregnation - water absorption | | |
|---|---|---|---|
| Treatment of the test specimen | Water absorption after 30 min. | (% by wt.) after 60 min. | Impregnating action compared with untreated wood (%) |
| untreated | 40.6 | 49.4 | — |
| Example 1 | 11.5 | 15.1 | 69.5 |
| Example 2 | 2.1 | 3.6 | 92.8 |
| Example 3 | 7.2 | 11.4 | 77 |
| Example 4 | 2.5 | 4.0 | 91.2 |
| Example 5 | 7.8 | 10.6 | 78.5 |
| Example 6 | 3.2 | 4.6 | 90.7 |
| Example 7 | 8.3 | 12.1 | 75.5 |
| Example 8 | 2.0 | 3.6 | 92.8 |
| Example 9 | 4.8 | 7.5 | 84.8 |
| Example 10 | 5.4 | 8.6 | 82.6 |
| Example 11 | 2.6 | 3.8 | 92.3 |

Examples 12 and 13

As in Examples 1 to 11, transparent, stable impregnating compositions were prepared from the constituents listed below in Examples 12 and 13, with the exception that 10 parts of water were added to the clear solutions.

Example 12

40.0 g of siloxane A 5.0 g of acetic acid (98% strength by weight in water)

40.0 g of methyltrimethoxysilane 10.0 g of silicic acid ester of the empirical formula $Si(OC_2H_5)_4$ having a viscosity of 1.0 mm²/s (obtainable under the trade name "Silikat TES 28" from Wacker-Chemie GmbH, Munich)

Example 13

40.0 g of siloxane A 5.0 g of acetic acid (98% strength by weight in water)

50.0 g of resin comprising 80% of $MeSiO_{3/2}$ and 20% of $Me_2SiO_{2/2}$ units and having an average viscosity of $10^6$ mm²/s 50.0 g of isooctyltrimethoxysilane Test specimens of pine wood of dimensions 4 cm ×4 cm ×10 cm were treated with the impregnating compositions by the vacuum pressure process (1 hour vacuum at 0.01 mPa, then 8 hours at 1 mPa) and subsequently stored for 4 weeks at 23° C. and 50% relative atmospheric humidity.

The impregnated test specimens were stored for 24 hours floating on water at 23° C., subsequently freed from adhering water by dabbing with filter paper and weighed.

The results are summarized in Table II.

TABLE II

| Treatment of the test specimen | Water absorption in % by weight |
|---|---|
| untreated | 60 |
| Example 12 | 20 |
| Example 13 | 14 |

What is claimed is:

1. A process for treating wood, wherein the wood is impregnated with a composition consisting essentially of (A) a salt of an organic or inorganic acid and an organopolysiloxane which contains SiC-bonded radicals with basic nitrogen in amounts of at least 0.5% by weight of basic nitrogen, based on the weight of this organopolysiloxane, (B) a water-repellent active compound, consisting essentially of
 (i) a silicone containing compound selected from
  (a) organosilicon compounds containing basic nitrogen in amounts of from 0% to 0.5% by weight, based on the total weight of the water repellent compound and silicic acid esters wherein the organo-silicon compounds and silicic acid esters are not solid at 20° C. under 1020 hPa, and
  (b) organosilicon compound which are solid at 20° C. and 1020 hPa, wherein said compounds are soluble in amounts of more than 50 parts by weight per 100 parts of (A), and/or
 (ii) organofluorine compounds, and
(C) water.

2. The process as claimed in claim 1, wherein organopolysiloxane of constituent (A) comprises units of the formula

  (I)

wherein

R is identical or different and represents hydrogen or mono-valent SiC-bonded organic radicals which are free from basic nitrogen, $R^1$ is identical or different and represents monovalent, SiC-bonded radicals containing basic nitrogen, $R^2$ is identical or different and represents a hydrogen atom or monovalent organic radicals, a is 0, 1, 2 or 3, b is 0, 1, 2 or 3 and c is 0, 1, 2 or 3, with the proviso that b is on average at least 0.05, the sum of a, b and c is less than or equal to 3 and the radical $R^1$ is present in amounts of more than 0.5% by weight of basic nitrogen per organopolysiloxane molecule.

3. The process as claimed in claim 1, wherein the water-repellent active compound (B) contains organosilicon compounds or silicic acid esters of units of the formula

  (III)

in which $R^5$ can be identical or different and represents hydrogen or monovalent, SiC-bonded organic radicals, $R^6$ can be identical or different and represents a hydrogen atom or monovalent organic radicals, d is 0, 1, 2, 3 or 4 and e is 0, 1, 2, 3 or 4, with the proviso that the sum of d and e is less than or equal to 4 and the content of basic nitrogen is 0% to 0.5% by weight, based on the weight of the particular organosilicon compound.

4. The process as claimed in claim 1, wherein component (B) further contains, as additives, tanning agents, fungicides, bactericides, preservatives, algicides, microbicides, odoriferous substances, flavor substances, flameproofing agents and/or solids which absorb ultraviolet light.

* * * * *